US009658135B2

(12) United States Patent
Steinbichler et al.

(10) Patent No.: US 9,658,135 B2
(45) Date of Patent: May 23, 2017

(54) TIRE INSPECTION APPARATUS, TIRE INSPECTION SYSTEM, AND METHOD FOR INSPECTING TIRES

(71) Applicant: Steinbichler Optotechnik GmbH, Neubeuern (DE)

(72) Inventors: Marcus Steinbichler, Neubeuern (DE); Junli Sun, Raubling (DE); Berndhart Leitner, Neubeuern (DE); Stefan Otte, Waldkraiburg (DE); Emanuel Fuchs, Rosenheim (DE); Tobias Huber, Zorneding (DE); Matthias Prams, Rohrdorf (DE); Rainer Huber, Piding (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 208 days.

(21) Appl. No.: 14/311,544

(22) Filed: Jun. 23, 2014

(65) Prior Publication Data
US 2014/0373614 A1   Dec. 25, 2014

(30) Foreign Application Priority Data
Jun. 21, 2013   (DE) .................. 10 2013 010 402

(51) Int. Cl.
*G01M 17/02*   (2006.01)
(52) U.S. Cl.
CPC .......... *G01M 17/027* (2013.01); *G01M 17/02* (2013.01); *G01M 17/021* (2013.01); *G01M 17/022* (2013.01)
(58) Field of Classification Search
CPC .................................... G01M 17/02

USPC .......................................... 73/146
See application file for complete search history.

(56) References Cited

U.S. PATENT DOCUMENTS

| 4,225,237 A * | 9/1980 | Rottenkolber ...... G01M 17/027 356/458 |
| 4,702,594 A * | 10/1987 | Grant .................. G01M 17/027 356/35.5 |
| 6,840,097 B1 * | 1/2005 | Huber .................... G01B 11/30 356/237.1 |

(Continued)

FOREIGN PATENT DOCUMENTS

| EP | 1043578 B1 | 10/2000 |
| EP | 2026056 A2 | 2/2009 |

OTHER PUBLICATIONS

J. Gryzagoridis, Laser Based Nondestructive Inspection Techniques, Springer Science, Jun. 30, 2012, pp. 295-302.*

*Primary Examiner* — Clayton E Laballe
*Assistant Examiner* — Kevin Butler
(74) *Attorney, Agent, or Firm* — Dilworth & Barrese, LLP

(57) ABSTRACT

A tire inspection apparatus for the optical inspection of a tire (4) comprises a housing with a support surface (3) for the tire (4) to be inspected; several measuring heads (7, 8, 9, 10; 12, 13, 14, 15, 16, 17), each of which comprises an optical measuring system, for inspecting the inside tread surface (11) and/or the external lateral surface (18) of the tire (4); and a positioning device (21, 22, 23, 24) for moving some or all of the measuring heads (7-10; 12-17) into a rest position and into a measuring position. To improve a tire inspection apparatus of this type, the measuring heads (7-10; 12-17) and the support surface (3) are installed without freedom of rotation.

25 Claims, 15 Drawing Sheets

(56) References Cited

U.S. PATENT DOCUMENTS

| | | | | |
|---|---|---|---|---|
| 2004/0212795 | A1* | 10/2004 | Steinbichler | G01B 11/162 356/35.5 |
| 2005/0109091 | A1* | 5/2005 | Steinbichler | G01M 17/027 73/146 |
| 2005/0268707 | A1* | 12/2005 | Dale, Jr. | G01M 17/027 73/146 |
| 2009/0044615 | A1* | 2/2009 | Steinbichler | G01M 17/027 73/146 |
| 2012/0134656 | A1* | 5/2012 | Mizukusa | G01N 21/8901 396/19 |
| 2013/0128029 | A1* | 5/2013 | Leobal | G01M 17/021 348/128 |
| 2014/0373614 | A1* | 12/2014 | Steinbichler | G01M 17/027 73/146 |

* cited by examiner

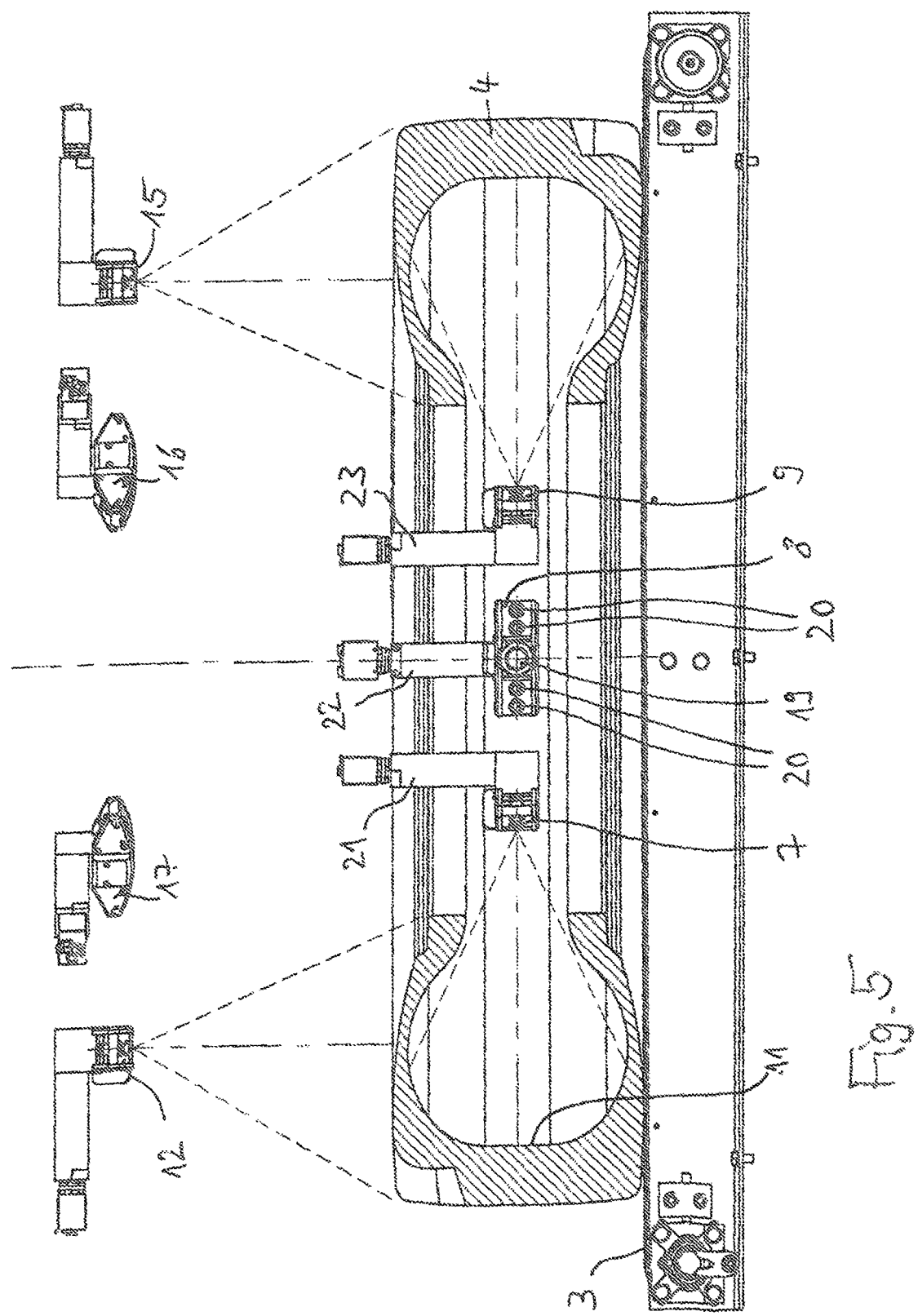

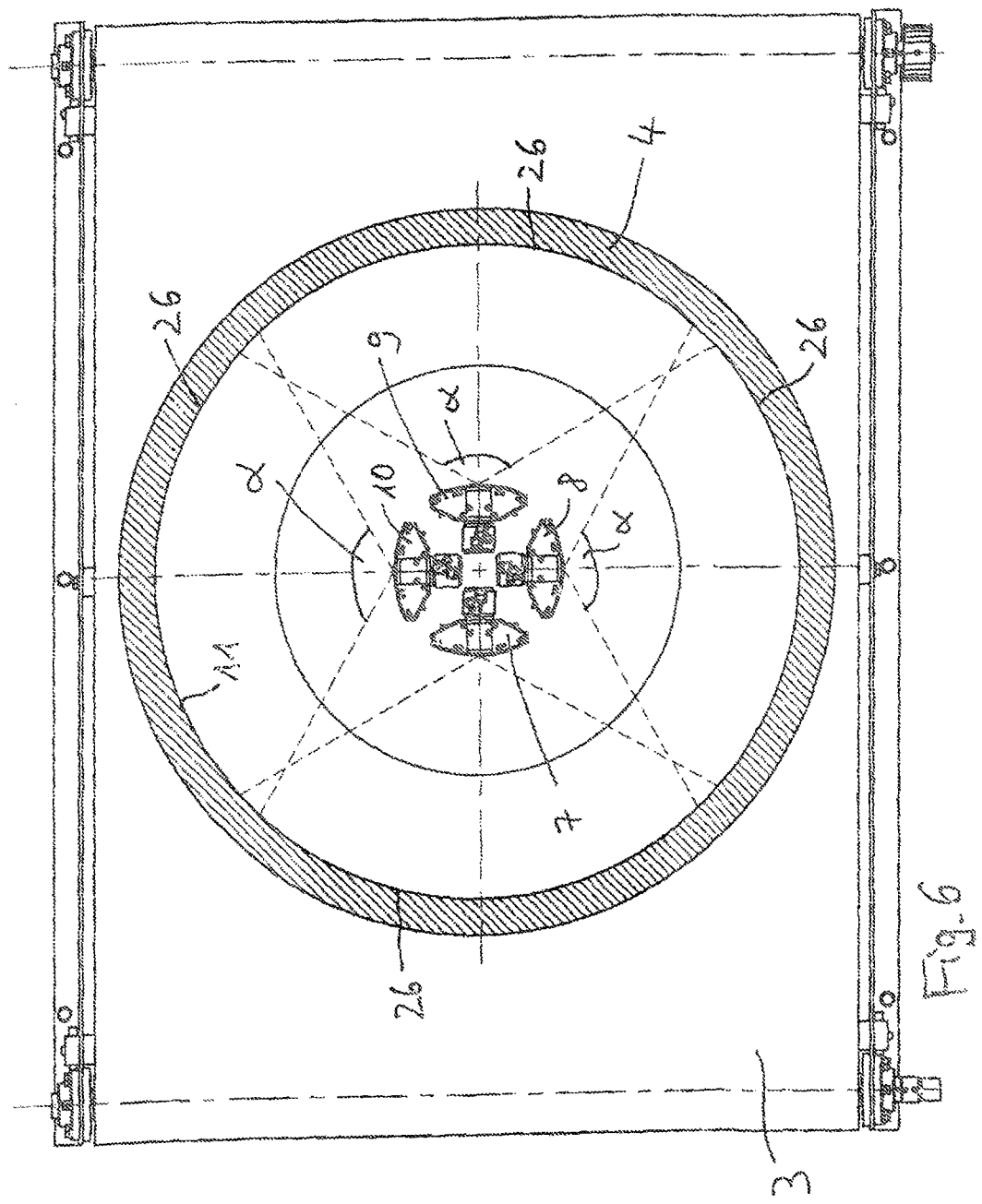

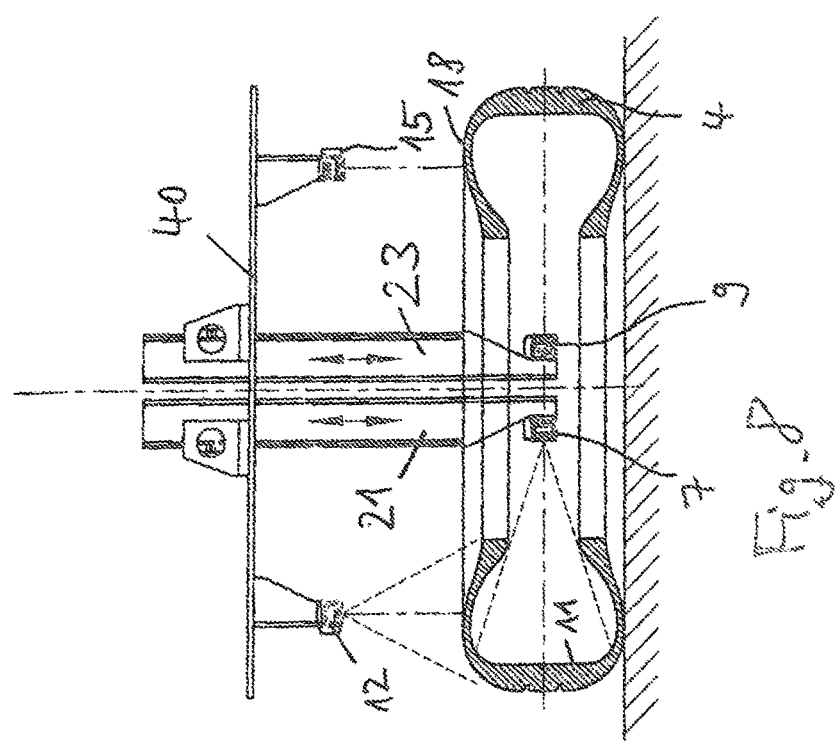
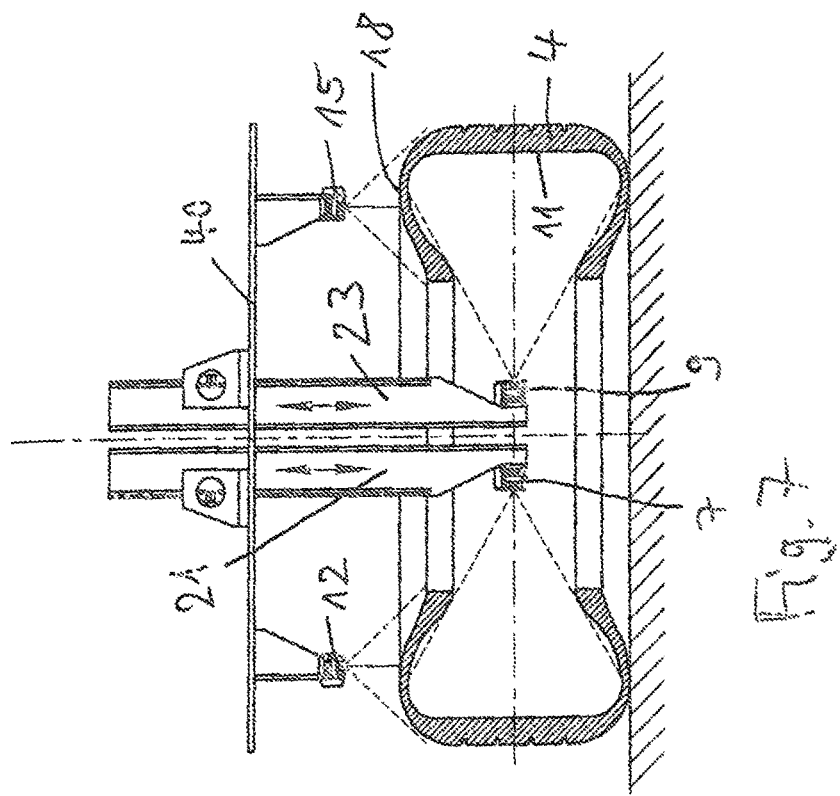

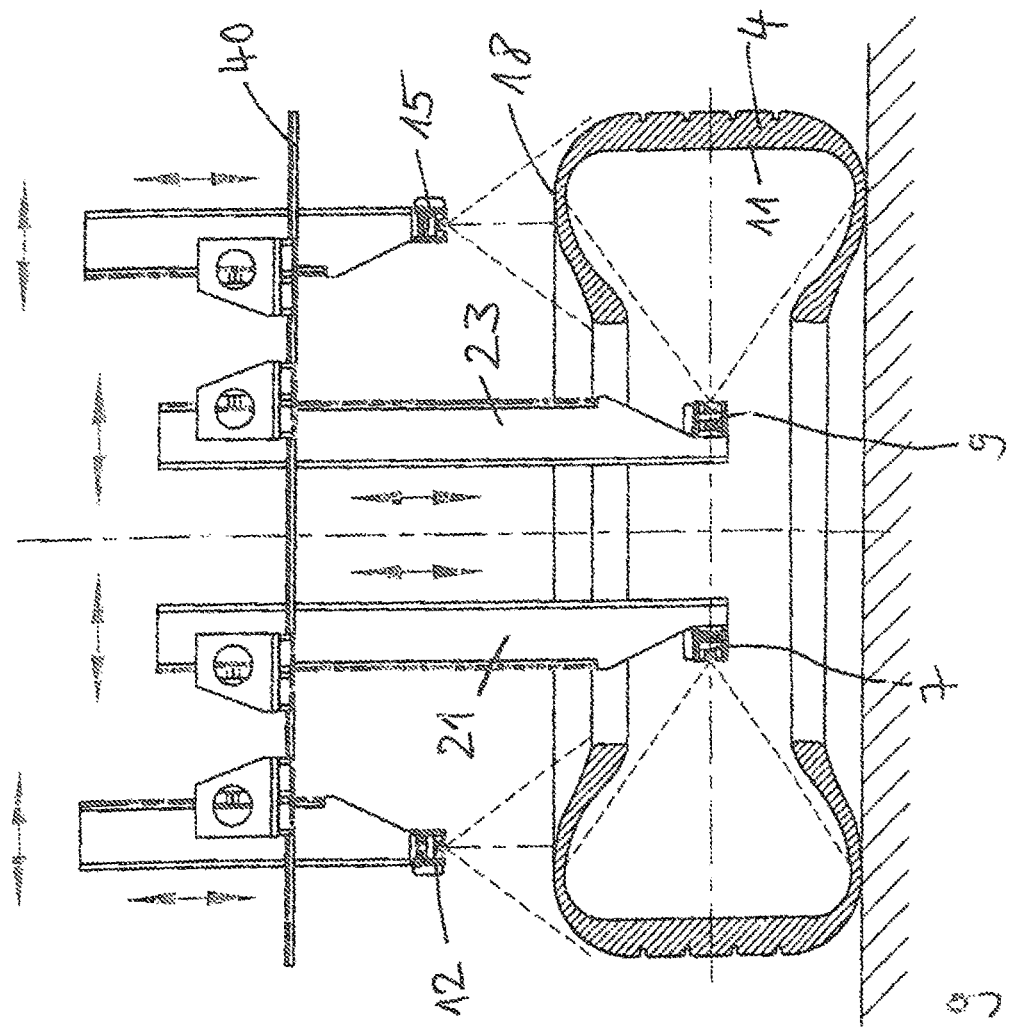

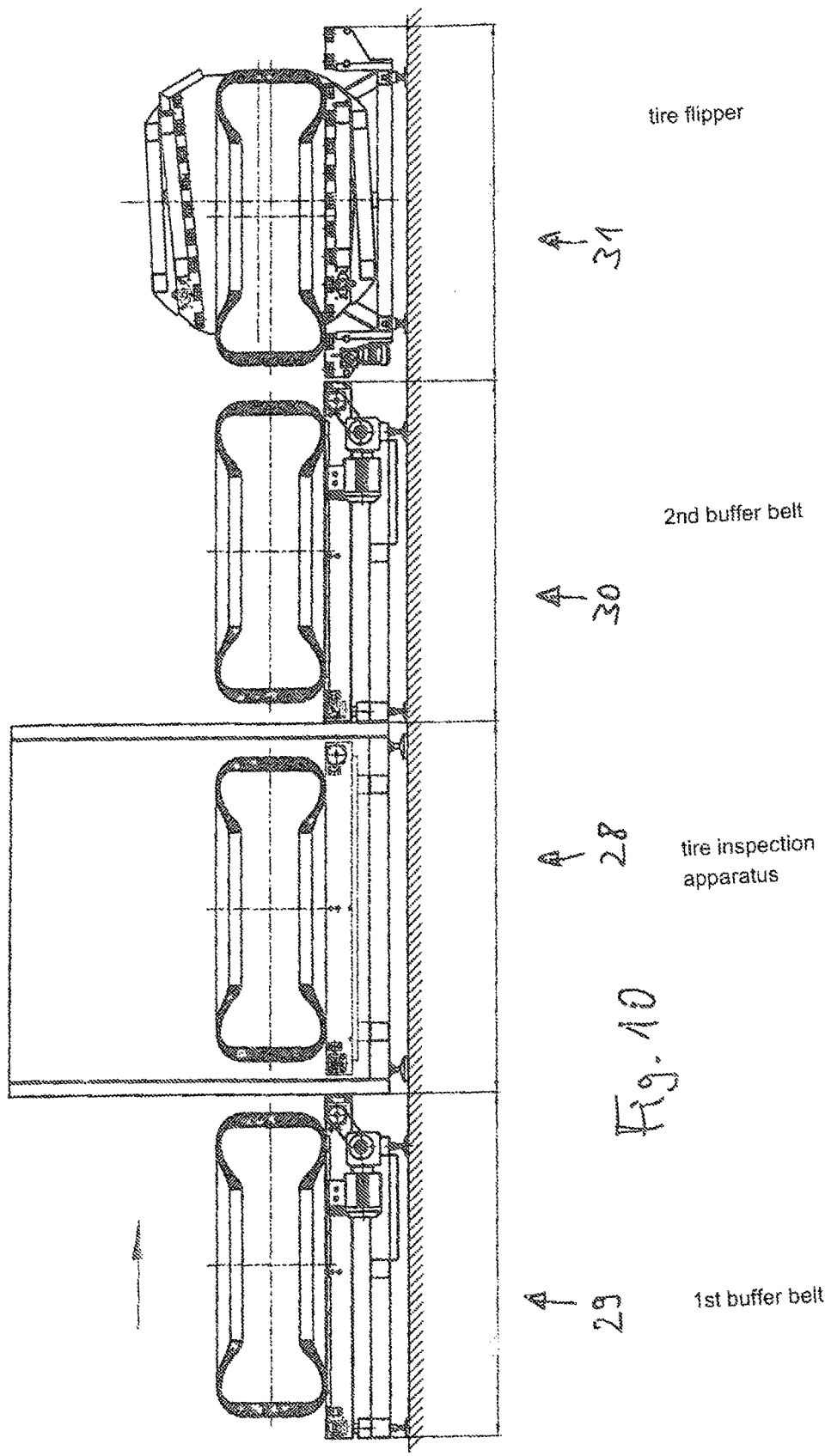

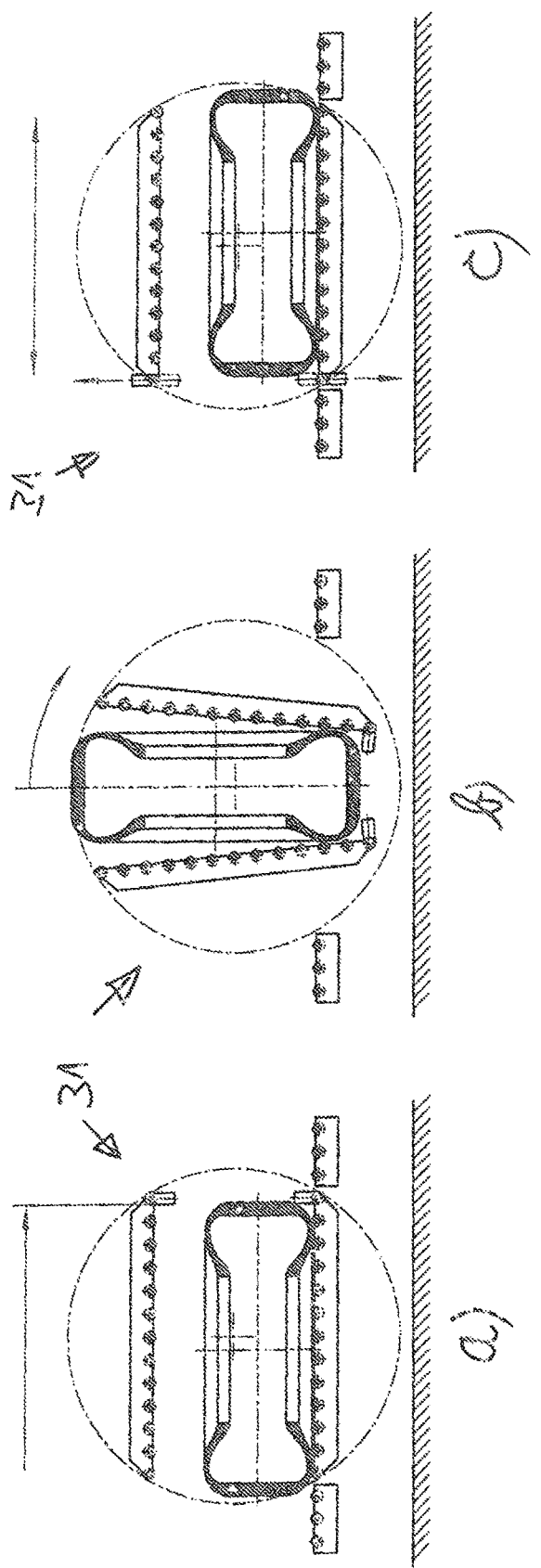

Fig. 12
tire inspection apparatus
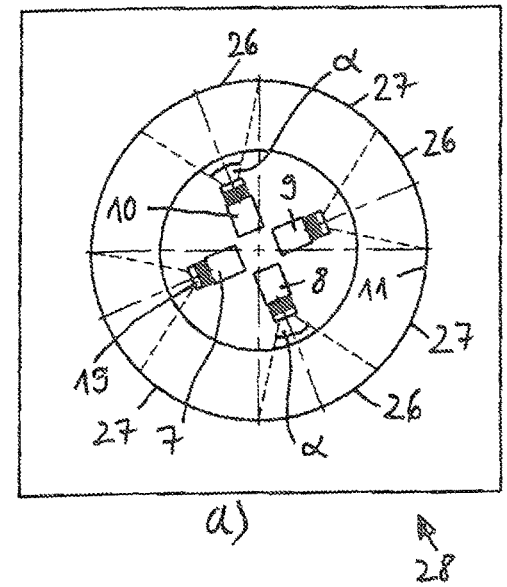
a)
tire flipper
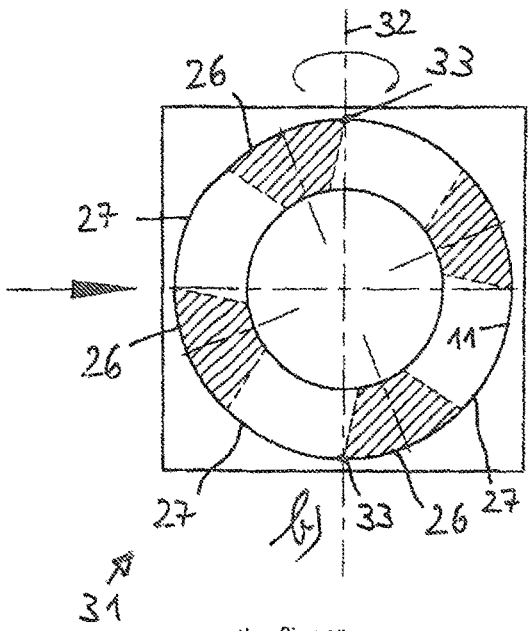
b)
tire inspection apparatus
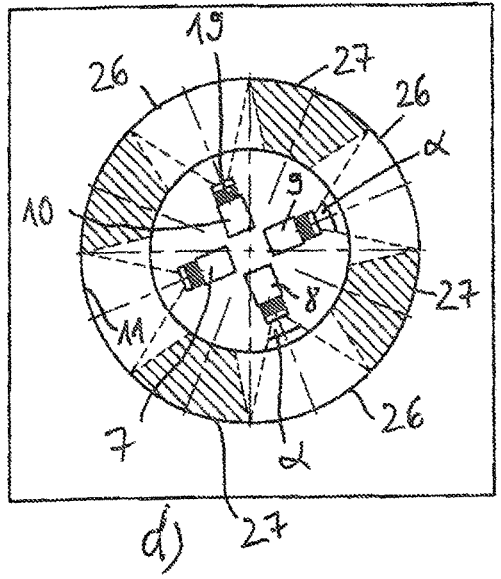
d)
tire flipper
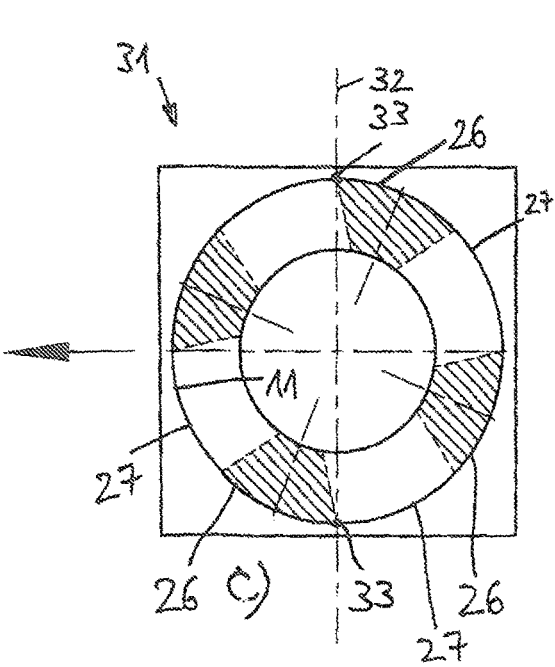
c)

Fig. 14
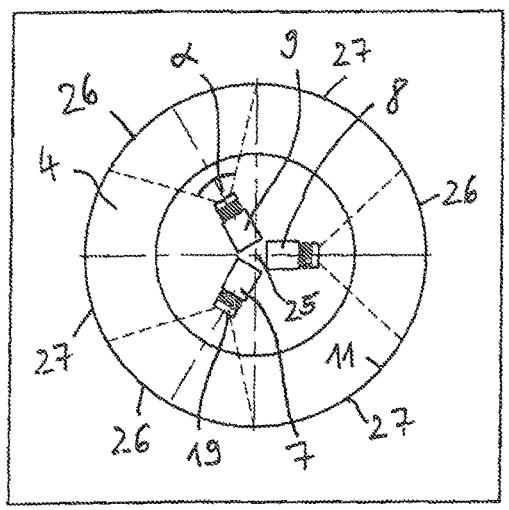
tire test apparatus
a)
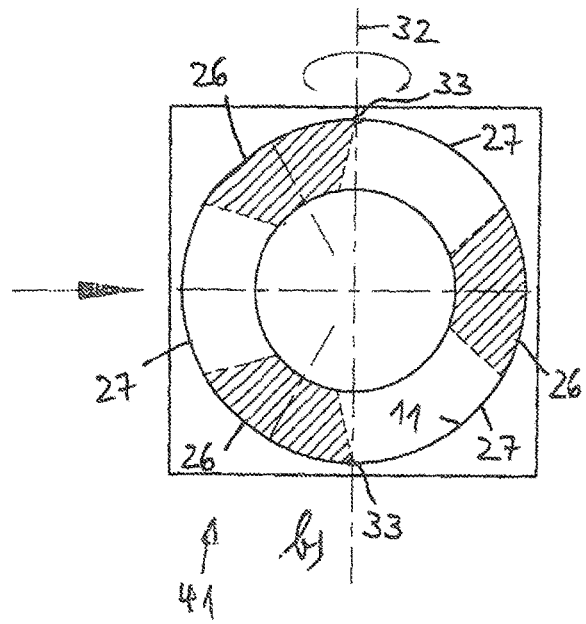
tire flipper
b)
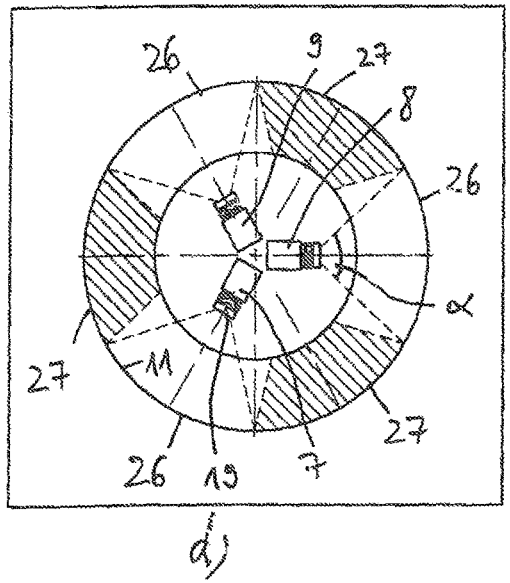
tire test apparatus
d)
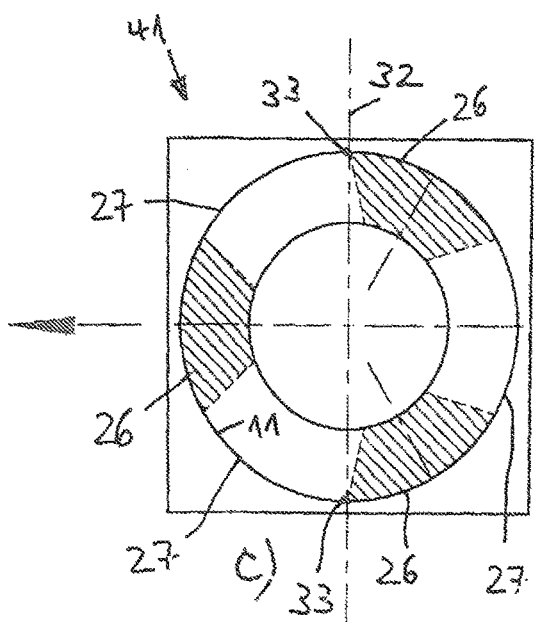
tire flipper
c)

Fig. 15
tire test apparatus
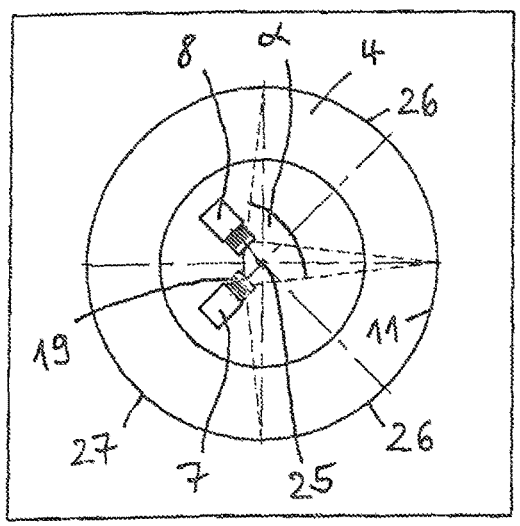
a)
tire flipper
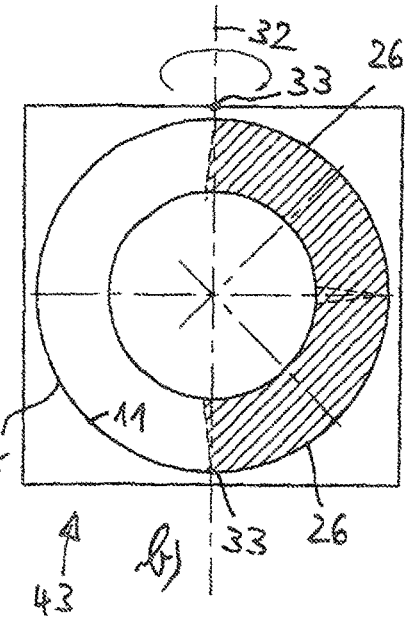
b)
tire test apparatus
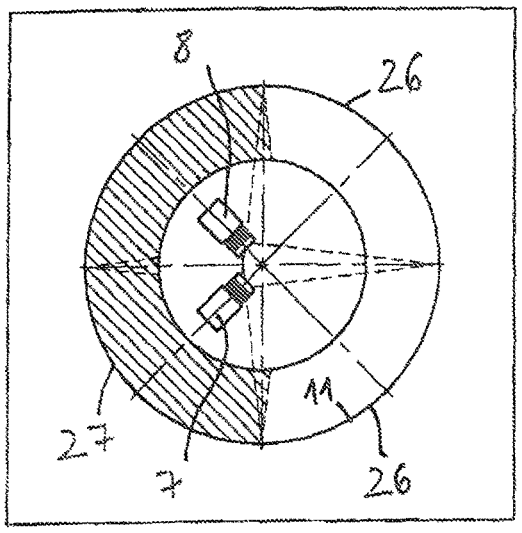
d)
tire flipper
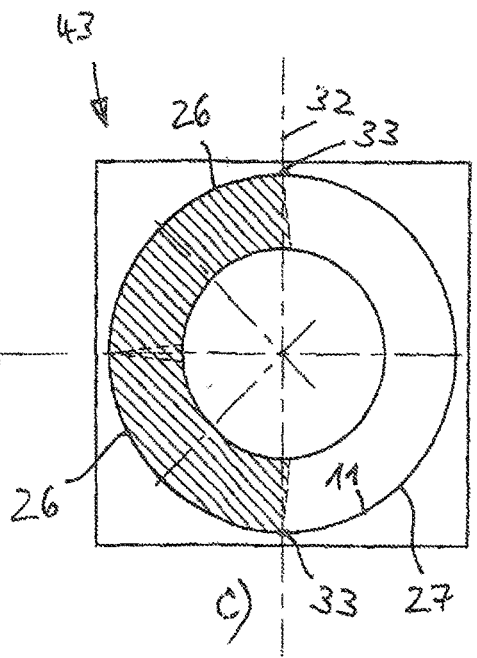
c)

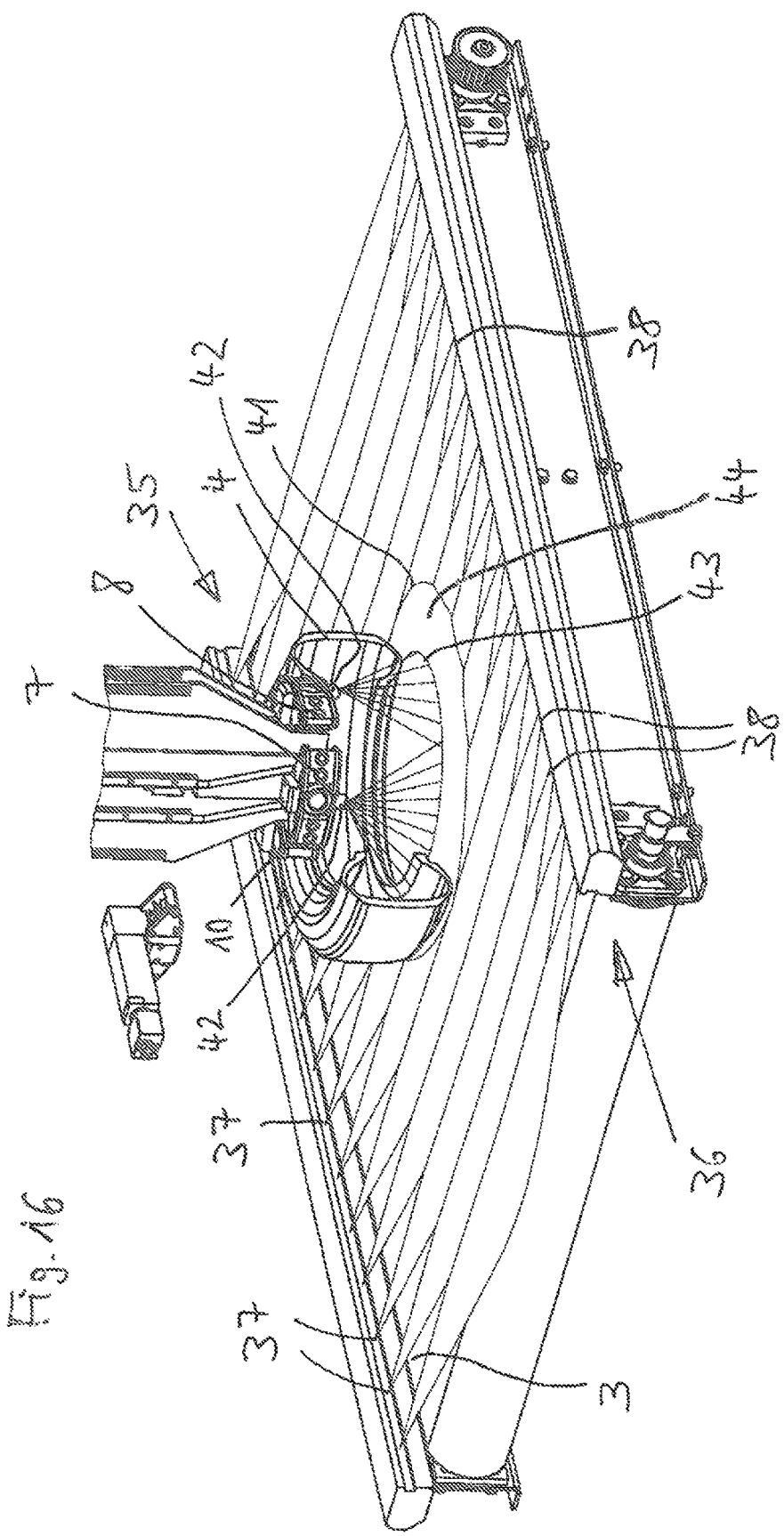

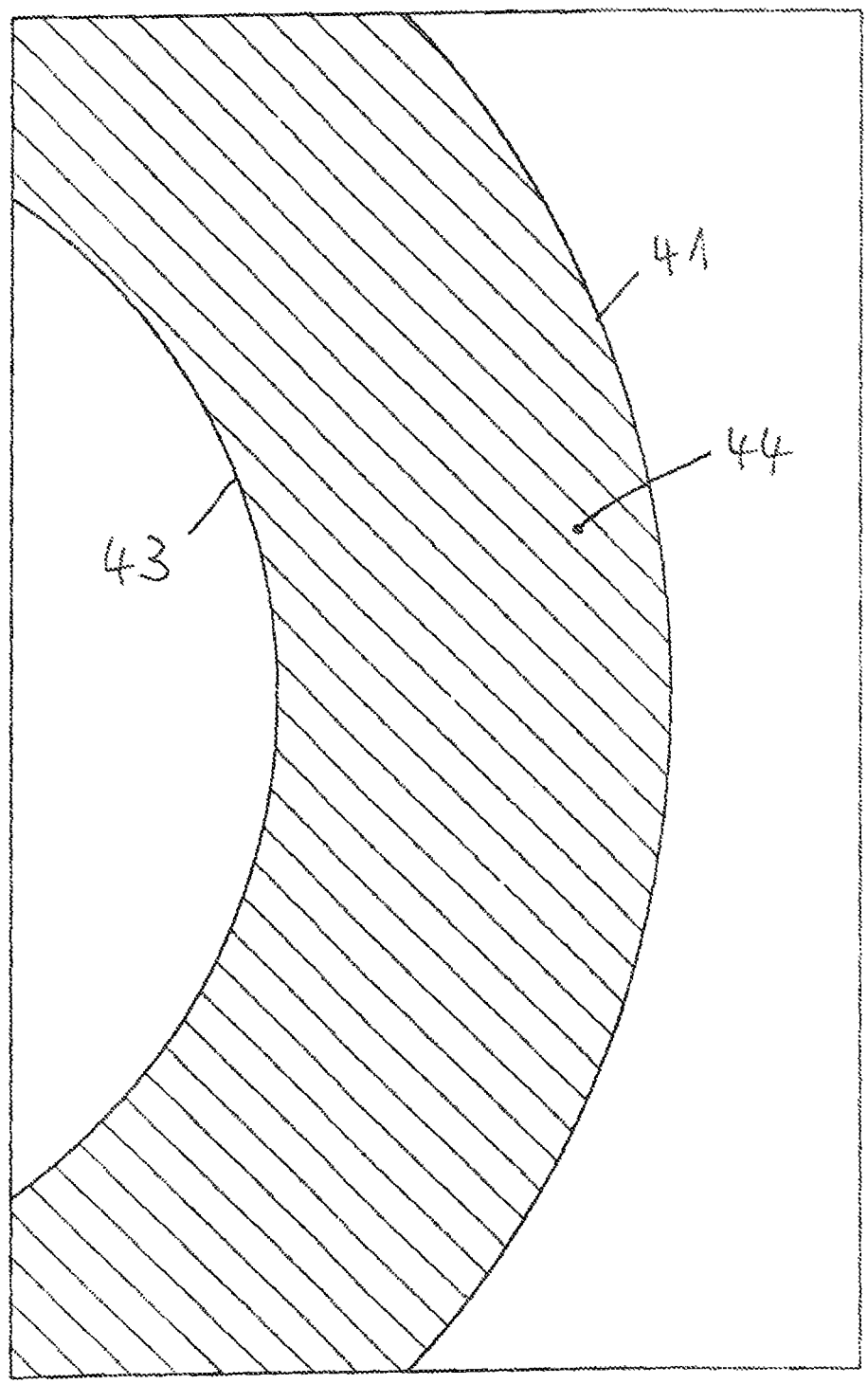

TIRE INSPECTION APPARATUS, TIRE INSPECTION SYSTEM, AND METHOD FOR INSPECTING TIRES

BACKGROUND OF THE INVENTION

The invention pertains to a tire inspection apparatus for the optical and especially for the interferometric inspection of tires, to a tire inspection system with a tire inspection apparatus of this type and a tire flipper, and to a method for the optical and especially for the interferometric inspection of tires.

A tire inspection apparatus is known from EP 1 043 578 B 1.

EP 2 026 056 A2 also discloses a tire inspection system.

When a tire is subjected to optical inspection, the tire is exposed to light, usually white light. The tire is then recorded by one or more measuring heads, each of which has an optical measuring system. By means of optical tire inspection, it is possible to determine surface defects on the tire, especially scratches, cuts, and/or creases and/or structural defects in the tire, especially bubbles and/or bulges. The defects can be determined by comparison with the areas adjacent to the defect where the surface of the tire is not defective and/or by means of comparison of the actual recorded tire data with previously established nominal data. The optical inspection of the tire can be carried out at ambient pressure. The housing of the tire inspection apparatus can be closed or open.

The interferometric inspection of tires is a relative inspection method, in which the surface contour of the tire in one state is compared with that in one or more other, different states. The tires are usually inspected in succession between one or more measuring heads at different circumferential positions. The measuring heads are positioned in such a way that one sector of the inside surface of the tread and/or of the external side wall can be observed. So that the complete tire can be inspected, the measuring head or heads are rotated section by section around the tire, so that in this way the complete circumference of the tire can be covered over the course of several successive inspections.

The previously known tire inspection apparatuses comprise a rotational axis for the measuring head or heads. There are also tire inspection apparatuses, however, in which it is the tire which is rotated. The associated amount of time required is currently responsible for the situation that, even though it is in fact logical and desirable to perform a complete inspection of new tires, such inspections are rarely done.

SUMMARY OF THE INVENTION

Against this background, the invention is based on the goal of proposing an improved tire inspection apparatus of the type indicated above, an improved tire inspection system of the type indicated above, and an improved method of the type indicated above.

With respect to a tire inspection apparatus of the type indicated above, this goal is achieved by the features herein. The tire inspection apparatus for the optical inspection of a tire comprises a housing with a support surface for the tire to be inspected; several measuring heads, each of which comprises an optical measuring system, for inspecting the inside surface of the tread and/or the external lateral surface of the tire; and a positioning device for moving several or all of the measuring heads into a rest position and into a measuring position. According to the invention, the measuring heads and the support surface are installed without freedom of rotation. This simplifies the tire inspection apparatus. During the optical inspection of a tire, the tire surface is studied by an imaging method capable of detecting unusual features typical of defects.

Advantageous elaborations are also described herein.

It is advantageous for the tire inspection apparatus to be designed for the interferometric inspection of a tire and for the housing to be designed as a pressure chamber. For the interferometric inspection of a tire, the surface of the tire is recorded in two or more different states. The images are compared with each other, as a result of which tire defects can be determined. To produce the different states of the tire, a positive pressure or a negative pressure is produced in the pressure chamber, preferably a negative pressure. A support surface for the tire to be inspected is present in the pressure chamber. The tire to be inspected is usually not mounted on a rim. It is usually lying flat on the support surface. The support surface is usually horizontal, and therefore the center axis of the tire is oriented vertically.

The measuring heads comprise an optical measuring system and preferably one or more light sources for coherent light, preferably laser light. The light sources are preferably formed by laser diodes.

Each measuring head also comprises a two-dimensional sensor for recording an image (image sensor), especially a CCD sensor or a CMOS sensor. The optical measuring system has a viewing angle. The viewing angle depends on the focal length of the optical measuring system and on the size of the image sensor. The visual field of the optical measuring system is derived from its viewing angle and the distance between the measuring head and the tire surface to be inspected.

The rest position of the measuring heads is selected so that it does not interfere with the positioning of the measuring head in the pressure chamber; in particular, the rest position of the measuring heads is above the tire as it is lying on the support surface. The measuring position of the measuring heads can be the same as the rest position. It can also be different from the rest position, however.

The measuring heads are mounted without freedom of rotation. The support surface is also installed without freedom of rotation. Relative rotation between the measuring heads and the tire lying on the support surface is therefore not possible. The measuring heads are preferably spaced uniformly around the circumference of the tire.

The measuring heads for inspecting the inside surface of the tire tread can be movable in the vertical direction. Preferably all of these measuring heads can be moved vertically as a unit. For this purpose they can be connected mechanically together. It is also possible, however, for these measuring heads to be connected to each other by way of a controller.

It is advantageous for the measuring heads for inspecting the outside lateral surface of the tire to be movable in the vertical direction. Preferably all of these measuring heads can be moved vertically as a unit. For this purpose, the measuring heads can be connected mechanically or by a controller.

Another advantageous elaboration is characterized in that one or more or all of the measuring heads for inspecting the inside surface of the tire tread and/or one or more or all of the measuring heads for inspecting the external lateral surface of the tire can be moved in the radial direction.

Preferably the viewing angle of the optical measuring system of one or more or all of the measuring heads is adjustable. The viewing angle can be adjusted by designing the optical measuring system so that its focal length is adjustable. Instead of or in addition to that, the evaluation range of the image sensor can be variable, especially in that only some of the pixels of the image sensor are evaluated.

According to another advantageous elaboration, the measuring heads for inspecting the inside surface of the tire tread inspect only a portion of the inside tread surface. This can be realized in particular in that the visual fields of the optical measuring systems are arranged a certain distance apart. The inspection which can thus be achieved can prove sufficient. In particular, the information on the quality of the studied lot of tires and on the quality of the manufacturing process obtainable in this way may already be adequate for the intended purpose.

According to another advantageous elaboration, the measuring heads for inspecting the inside surface of the tire tread inspect the entire inside tread surface.

The tire inspection apparatus preferably comprises a device for determining the diameter and/or the height of the tire. This device preferably makes it possible to determine additional properties of the tire as well.

According to another advantageous elaboration, the tire inspection apparatus comprises a memory unit for storing the diameter and/or the height of the tire and/or additional properties of the tire. The properties of the tire which have been determined in particular by the device for determining one or more properties, especially the determined diameter and/or the determined height of the tire, can be stored in the memory unit. It is also possible, however, for this information to be transferred to external sources, such as the database maintained by the operator of the tire inspection apparatus.

According to another advantageous elaboration, the tire inspection apparatus comprises a unit for prepositioning and/or positioning one or more or all of the measuring heads as a function of the diameter and/or the height of the tire and/or of one or more additional properties of the tire.

It is possible in particular for the measuring heads to be prepositioned in the radial direction as a function of the diameter of the tire. Instead of or in addition to that, the measuring heads can be prepositioned in the vertical direction as a function of the height of the tire.

The measuring heads can be brought into the measurement position in the radial direction as a function of the diameter of the tire. Instead of or in addition to that, they can be brought into the measurement position in the vertical direction.

The tire inspection apparatus preferably comprises a device for determining the contour of the tire, especially the external contour and/or the internal contour. As a result, it is possible to subject to evaluation only the pixels which are within the contour.

Accordingly, it is advantageous for the tire inspection apparatus to comprise a device for evaluating the resulting images within the contour. If such a device is present, it is advantageous to restrict the evaluation to the pixels of the resulting images present within the contour.

An inventive tire inspection system comprises an inventive tire apparatus and a tire flipper. A tire is inspected by the inspection apparatus of the tire inspection system; it is then flipped by the tire flipper; and finally it is reinspected by the tire inspection apparatus.

It is advantageous for the tire inspection system to comprise a tire flipper for turning the tire to the correct position. This is especially advantageous in cases where only a portion of the interior surface of the tire tread is inspected by the measuring heads. In this case, after the partial inspection, the tire is then flipped to the correct position, and the remaining, as-yet-uninspected portion of the interior tire tread is inspected.

The tire inspection system can comprise a second inventive tire inspection apparatus. In this case, the first tire inspection apparatus can inspect an external lateral surface and part or all of the inside surface of the tire tread. After the tire has been flipped, the other external lateral surface of the tire and possibly the remaining portion of the inside tread surface are inspected. It is also possible, however, for the entire inside tread surface to be inspected only by the second tire inspection apparatus.

In a method for the optical inspection of a tire in a housing, in which the tire is inspected by several measuring heads, the goal of the invention is achieved by the features herein. The measuring heads and the tire do not rotate with respect to each other. As a result, the method is simplified and accelerated.

According to an advantageous elaboration, the tire is inspected by interferometry in a pressure chamber. The inspection proceeds preferably in that the tire is recorded in a first state; in that the tire is then recorded in a second state different from the first state; and in that the images are compared with each other.

It is advantageous for the measuring heads for inspecting the inside tread surface of the tire and/or the measuring heads for inspecting the external lateral surface of the tire to move in the vertical direction The measuring heads for inspecting the inside tread surface of the tire and/or the measuring heads for inspecting the external lateral surface of the tire can preferably move in the radial direction.

According to another advantageous elaboration, the measuring heads for inspecting the inside surface of the tire tread inspect a portion of the inside tread surface or the entire inside surface of the tire tread.

It is advantageous for one or more or all of the measuring heads to be prepositioned and/or positioned as a function of the diameter and/or the height of the tire and/or of one or more other properties of the tire.

Preferably only the pixels of the resulting images which lie within the contour of the tire are evaluated.

In an advantageous elaboration, furthermore, the tires are inspected in a first inspection pass, flipped, and then inspected in a second inspection pass.

It is advantageous for half of the inside surface of the tire tread to be inspected in the first inspection pass, for the tire then to be flipped and put in the correct position, and finally for the other half of the inside surface of the tire tread to be inspected in a second inspection pass.

According to another elaboration, a second tire is inspected in a first inspection pass while the first tire is being flipped. This makes it possible to accelerate the inspection procedure even more.

BRIEF DESCRIPTION OF THE DRAWINGS

An exemplary embodiment of the invention is explained in detail below on the basis of the attached drawing:

FIG. 5 shows a partial cross section, from the side, of the part of the tire inspection apparatus shown in FIGS. 2-4;

FIG. 6 shows a diagram, corresponding to that of FIG. 4, of a modification of the tire inspection apparatus;

FIG. 7 shows a diagram, corresponding to that of FIG. 5, of a modification of the tire inspection apparatus with measuring heads for inspecting the inside surface of the tire tread, the heads being vertically movable;

FIG. 8 shows a modification according to FIG. 7 for the inspection of a tire of reduced height;

FIG. 9 shows a modification of the tire inspection apparatus according to FIGS. 7 and 8 in which the measuring heads for inspecting the external lateral surface of the tire are also vertically movable and in which all of the measuring heads are radially movable;

FIG. 10 shows a partial cross-sectional view, from the side, of a tire inspection system;

FIG. 11a shows a side view of a tire flipper in a starting position;

FIG. 11b shows the tire flipper according to FIG. 11a in an intermediate position;

FIG. 11c shows the tire flipper according to FIGS. 11a and 11b in the final position.

FIGS. 12a-d represent a sequence plan of the operation of the tire inspection system according to FIG. 10 with a tire inspection apparatus with four measuring heads for inspecting the inside surface of the tire tread;

FIGS. 14a-d represent a sequence plan of the operation of the tire inspection system according to FIG. 10 with a tire inspection apparatus with three measuring heads for inspecting the inside surface of the tire tread;

FIGS. 15a-d represent a sequence plan of the operation of the tire inspection apparatus according to FIG. 10 with a tire inspection apparatus with two measuring heads for inspecting the inside surface of the tire tread;

FIG. 16 shows part of the tire inspection apparatus with a device for determining the contour of the tire; and FIG. 17 shows an image produced by the device for determining the contour of the tire according to FIG. 16.

DESCRIPTION OF THE PREFERRED EMBODIMENTS

Figure 1:
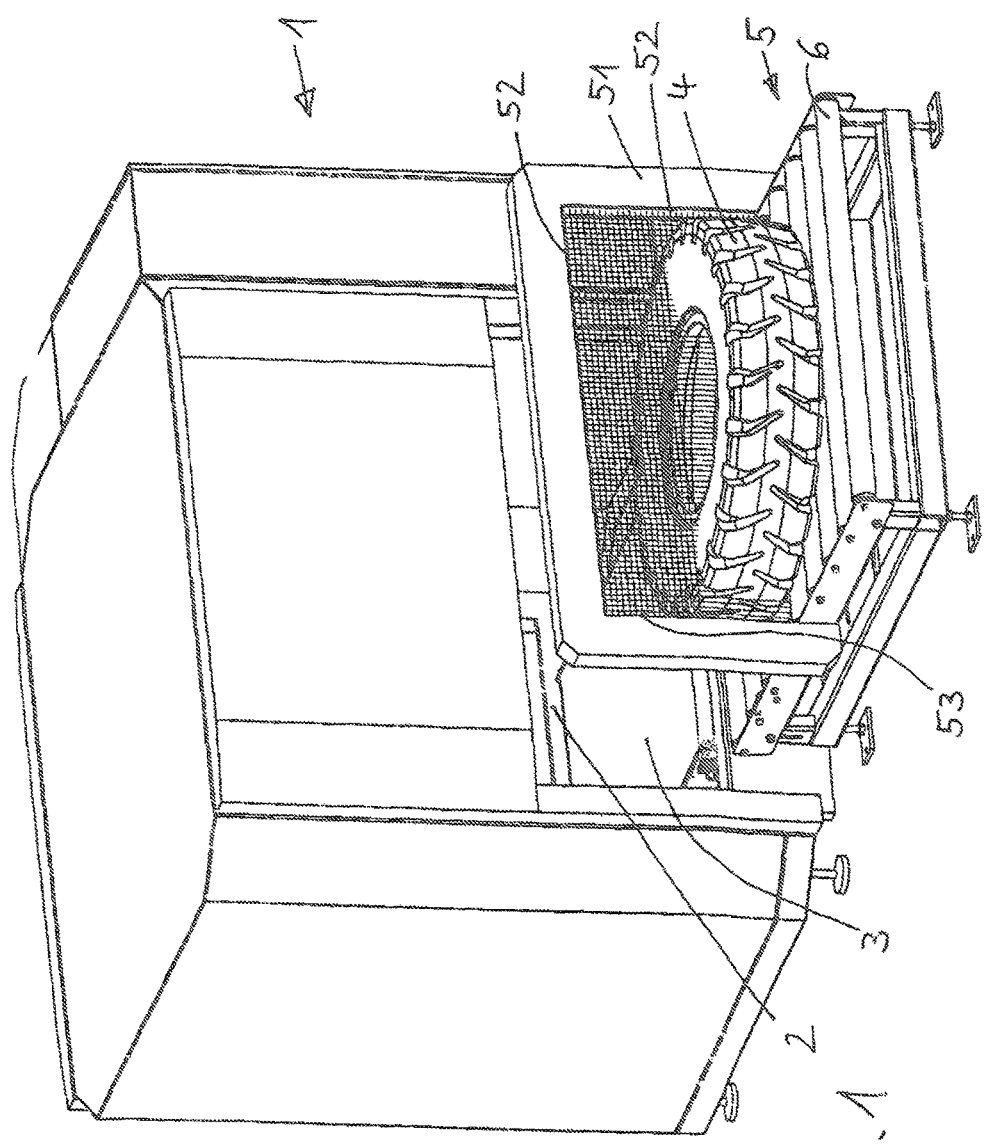
FIG. 1 shows a tire inspection apparatus in perspective, the tire being located outside the tire inspection apparatus.
Figure 2:
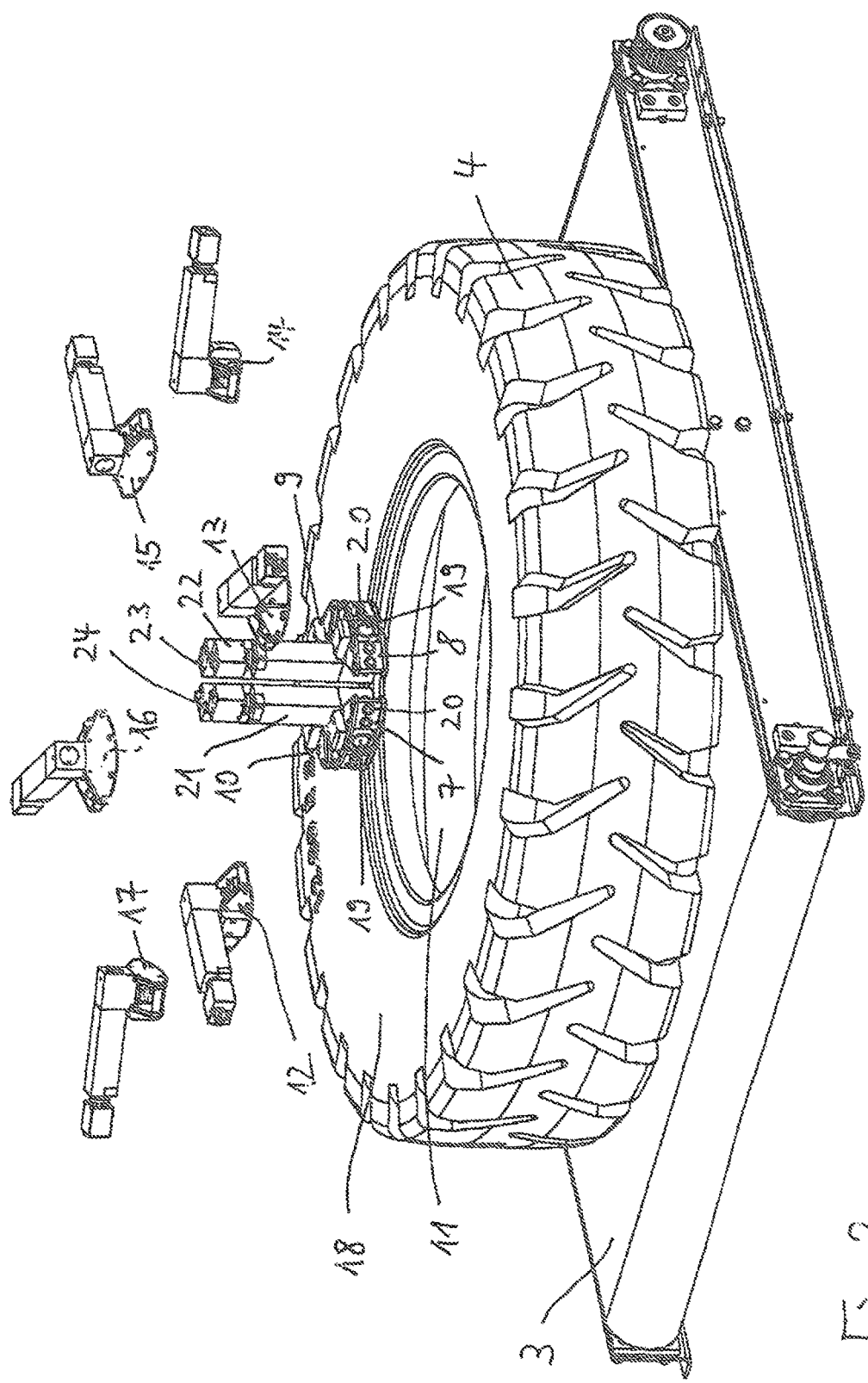
FIG. 2 shows a part of the tire inspection apparatus according to FIG. 1, wherein the tire is resting on the support surface of the tire inspection apparatus.

The tire inspection apparatus shown in FIG. 1 for the optical inspection of tires comprises a housing with a support surface 3 for the tire 4 to be inspected. It is designed as a tire inspection apparatus for the interferometric inspection of the tire 4. Accordingly, the tire inspection apparatus comprises a pressure chamber 1 with a door opening 2, which can be closed by a sliding door. The sliding door is guided so that it can travel vertically and is driven in this direction.

A horizontal support surface 3 for a tire 4 to be inspected is arranged in the pressure chamber 1. The support surface 3 is located behind the door opening 2. It is formed by a conveyor belt, which can be driven by two end pulleys. In front of the door opening 2, a buffer belt 5 is arranged, which comprises several horizontally oriented rollers 6, on which the tire 4 rests. The tire 4 is not mounted on a rim. It is transported via the buffer belt 5 through the door opening onto the support surface 3. For this purpose, one or more rollers 6 of the buffer belt 5 can be driven.

In front of the door opening 2, a device for determining the diameter and the height of the tire 4 is provided. This device comprises a frame 51, which is higher and wider than the tire 4. Oriented light sources 52 and light receivers 53 are arranged on the frame 51. The light sources 52 emit in the horizontal and vertical directions. A light receiver 53 belongs to each light source 52. The light sources 52 and the light receivers 53 form a rectilinear grid for detecting the height and the diameter of the tire 4.

As can be seen in FIGS. 2-5, the inspection apparatus comprises four measuring heads 7, 8, 9, 10 for inspecting the inside surface of the tread 11 of the tire 4. The inspection apparatus also comprises six measuring heads 12, 13, 14, 15, 16, 17 for inspecting the external lateral surface 18 of the tire 4. Each measuring head comprises an optical measuring system 19 and four laser diodes 20, two on each side of the optical measuring system 19. The optical measuring system 19 and the laser diodes 20 are arranged in a row, wherein the optical measuring system 19 is located in the center.

The measuring heads 7, 8, 9, 10 for inspecting the inside surface 11 of the tread of the tire 4 are distributed uniformly around the circumference. They are arranged 90° apart.

The measuring heads 12, 13, 14, 15, 16, 17 for inspecting the external lateral surface 18 of the tire 4 are fastened to a carrier 40 (see FIGS. 7-9). They cannot be moved in the vertical direction. The carrier 40 is located in the pressure chamber 1. It cannot be moved in the vertical direction.

The measuring heads 7, 8, 9, 10 for inspecting the inside tread surface 11 of the tire 4 can be moved in the vertical direction. For this purpose, each measuring head 7, 8, 9, 10 is arranged at the bottom end of a vertically oriented column 21, 22, 23, 24, which can move vertically. The columns 21-24 are fastened to the carrier 40.

All of the measuring heads 7, 8, 9, 10, 12, 13, 14, 15, 16, 17 are mounted without freedom of rotation. The support surface 3 for the tire 4 is also mounted in the chamber 1 without freedom of rotation. It is therefore impossible for the measuring heads and the tire 4 to rotate relative to each other.

To carry out an inspection, the tire 4 is moved into the pressure chamber 1. The door of the pressure chamber 1 is closed. The measuring heads 7, 8, 9, 10 for inspecting the inside tread surface 11 of the tire 4 are moved vertically downward from the rest position according to FIG. 2 until they arrive in the measuring position shown in FIG. 5, in which they are at the half-way point of the vertical dimension of the inside tread surface 11. It is in this position that the images are recorded.

In the case of an optical tire inspection, it is sufficient for each measuring head to record one image. In the case of an interferometric tire inspection, several images, in particular two images, are recorded by each measuring head. The recording of the first images is carried out at a first pressure in the pressure chamber, which can be ambient pressure.

Then the pressure in the pressure chamber is changed, preferably reduced. As a result, defects in the material of the tire 4 can expand. Then additional images of the tire 4 are recorded by the measuring heads. By means of the interferometric inspection method, changes in the shape of the tire can be made visible.

Then the measuring heads 7, 8, 9, 10 for inspecting the inside tread surface 11 of the tire 4 are moved vertically upward. The door of the pressure chamber 1 is opened, and the tire 4 is moved out.

Figure 4:
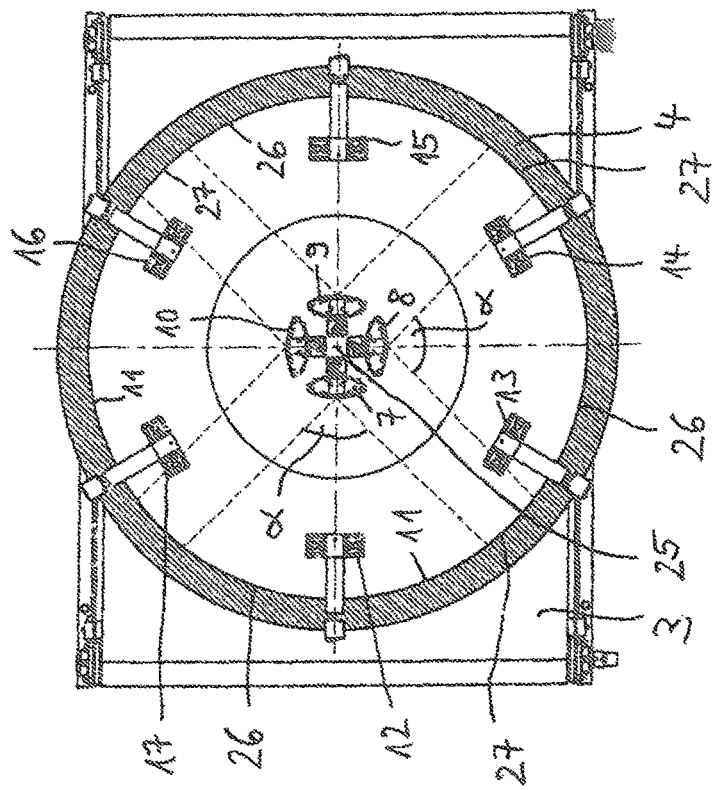
FIG. 4 shows a partial cross-sectional view, from above, of the part of the tire inspection apparatus shown in FIGS. 2 and 3.
Figure 3:
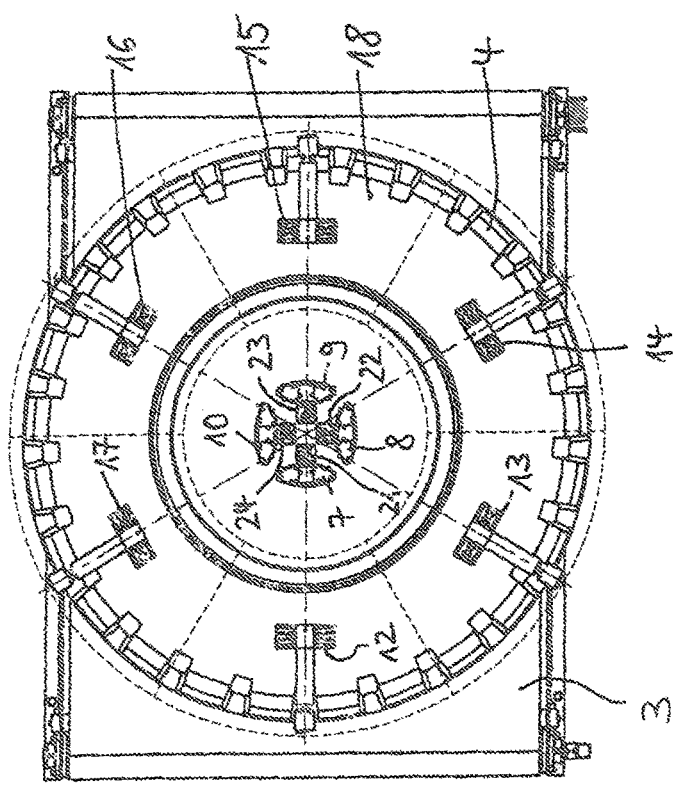
FIG. 3 shows a view, from above, of the part of the tire inspection apparatus shown in FIG. 2.

As can be seen in FIG. 4, the measuring heads 7, 8, 9, 10 for inspecting the inside tread surface 11 of the tire 4 inspect only a part of the inside tread surface 11. The viewing angle α of the measuring heads is approximately 90°. Because the measuring heads 7, 8, 9, 10 are located a certain distance away from the central axis 25 of the tire, however, the visual field 26 of the measuring heads is less than one-quarter of the circumference of the inside tread surface 11, so that adjacent visual fields 26 are interrupted by gaps 27. For a rapid inspection of the tire 4, however, it may not matter that the coverage of the inside tread surface 11 is incomplete. As can be seen in FIG. 4, the distance between the individual measuring head 7, 8, 9, 10 and the inside tread surface 11 is less than the distance between the inside tread surface 11 and the central axis 25 of the tire 40, so that the visual field 26 of the measuring heads is less than 90°.

In the case of the modification of the tire inspection apparatus shown in FIG. 6, the viewing angles α of the optical measuring systems 19 of the measuring heads 7, 8, 9, 10 for inspecting the inside tread surface 11 are greater than 90°. They are approximately 110-130°, preferably 120°. Here the visual fields 26 of adjacent measuring heads 7-10 overlap, so that there are no gaps. The optical measuring systems 19 of the embodiment according to FIG. 4 can be different from those of FIG. 6. In particular, they can differ with respect to their focal lengths. It is also possible, however, to use the same optical measuring systems 19 for the embodiments of both FIGS. 4 and 6, in which case the focal lengths are adjustable. In this embodiment as well, the distance between the measuring heads 7, 8, 9, 10 and the inside tread surface 11 is smaller than the distance between the inner tread surface 11 and the central axis 25 of the tire 4.

FIGS. 7 and 8 show the use of the tire inspection apparatus for tires of different heights. When the tire 4 shown in FIG. 8 with a lower height is to be inspected, the measuring heads 7, 8, 9, 10 for inspecting the inside tread surface 11 are moved vertically downward until they lie at the half-way point of the height of the inside tread surface 11. The measuring heads 12-17 for inspecting the external lateral surface 18 are mounted on a carrier 40, which is installed in a permanent position in the pressure chamber 1. They cannot be moved vertically. They do, however, have optical measuring systems 19, the viewing angles α of which are adjustable. By changing the focal length, the viewing angle is decreased when a tire 4 of lesser height is to be inspected, as shown in FIG. 8.

In the embodiment according to FIG. 9, the measuring heads 12-17 for inspecting the external lateral wall 18 are also movable in the vertical direction. In this embodiment, furthermore, both the measuring heads 7-10 for inspecting the inside tread surface 11 and the measuring heads 12-17 for inspecting the external lateral surface 18 are movable in the radial direction.

FIG. 10 shows a tire inspection system with a tire inspection apparatus 28 of the previously described type, with a first buffer belt 29, with a second buffer belt 30, and with a tire flipper 31. The second buffer belt 30 lies between the tire inspection apparatus 28 and the tire flipper 31. The first buffer belt 29 lies on the side of the tire inspection apparatus 28 opposite the second buffer belt 30. At each of the stations 28, 29, 30, 31, there is one motorized pulley for the support surface formed by a conveyor belt. The tire inspection apparatus 28 comprises two vertical doors, guided with freedom of movement in the longitudinal direction, one of which faces the first buffer belt 29, the other the second buffer belt 30.

During operation, a tire is conveyed by the first buffer belt 29 into the tire inspection apparatus 28. There the upper external lateral surface of the tire is inspected. In addition, a portion of the inside tread surface or the entire inside tread surface can be inspected. Next, the tire is sent to the second buffer belt 30. Simultaneously, a second tire can be conveyed by the first buffer belt 29 into the tire inspection apparatus 28.

The first tire lying on the second buffer belt 30 is sent to the tire flipper 31 and flipped. During this phase, the second tire can be inspected in the tire inspection apparatus 28.

After the first tire is flipped, it is sent back to the second buffer belt 30. When the inspection of the second tire in the tire inspection apparatus 28 is finished, this second tire is conveyed back to the first buffer belt 29. The first tire is now conveyed by the second buffer belt 30 back into the tire inspection apparatus 28. The other external lateral surface, which is now on top, is then inspected. Simultaneously, a portion or the entire inside surface of the tread can be inspected.

When the first tire has been completely inspected in this way, it is conveyed onward via the second buffer belt 30 and the tire flipper 31, which this time does not flip the tire, toward the right in FIG. 10 to the next station (not shown in the drawing). The second tire is conveyed by the first buffer belt 29 via the tire inspection apparatus 28 and the second buffer belt to the tire flipper 31. Simultaneously, a third tire is conveyed via the first buffer belt 29 into the tire inspection apparatus 28. The second tire is flipped in the tire flipper 31. During this phase, the third tire is inspected in the tire inspection apparatus 28.

FIG. 11 shows the function of the tire flipper 31. First the tire 4 is conveyed into the tire flipper 31 as shown in FIG. 11a. The tire 4 is flipped as shown in FIG. 11b. In the final position according to FIG. 11c, the flipped tire 4 is lying in the tire flipper 31.

FIG. 12 shows a sequence plan of the operation of the tire inspection system according to FIG. 10. A tire inspection apparatus 28 according to FIG. 4 is being used here, in which the measuring heads 7-10 for inspecting the inside tread surface 11 inspect only a portion of the inside tread surface 11, therefore leaving the gaps 27 between the visual fields 26. The visual fields 26 cover half or somewhat more than half of the circumference of the inside tread surface 11.

In a first inspection pass according to FIG. 12a, the portion of the inside tread surface 11 which corresponds to the visual fields 26 is inspected. Then, as shown in FIG. 12b, the tire is flipped to the correct position shown in FIG. 12c. The turning axis 32 of the tire flipper 31 passes through the boundaries 33 between a visual field 26 and the adjacent gap 27. This ensures that, after the tire has been flipped, the visual fields 26 are located at the places where previously the gaps 27 were situated and vice versa.

The tire 4, now flipped into the correct position, is then conveyed into the tire inspection apparatus 28, as shown in FIG. 12d, and reinspected in a second inspection pass. The parts of the circumference of the inside tread surface 11 which were not inspected during the first inspection run are now inspected. As a result of way in which the tire 4 is flipped, the areas of the circumference of the tread surface 11 not covered during the first inspection pass are covered in the second inspection pass, even though the measuring heads 7-10 for inspecting the inside tread surface 11 and the support surface 3 for the tire 4 are unable to rotate. As a result, the tire 4 can be inspected very quickly by only a single tire inspection apparatus. The working speed of the tire inspection apparatus can be increased even more by subjecting the next tire to the first inspection pass while the first tire is being flipped.

Figure 13:
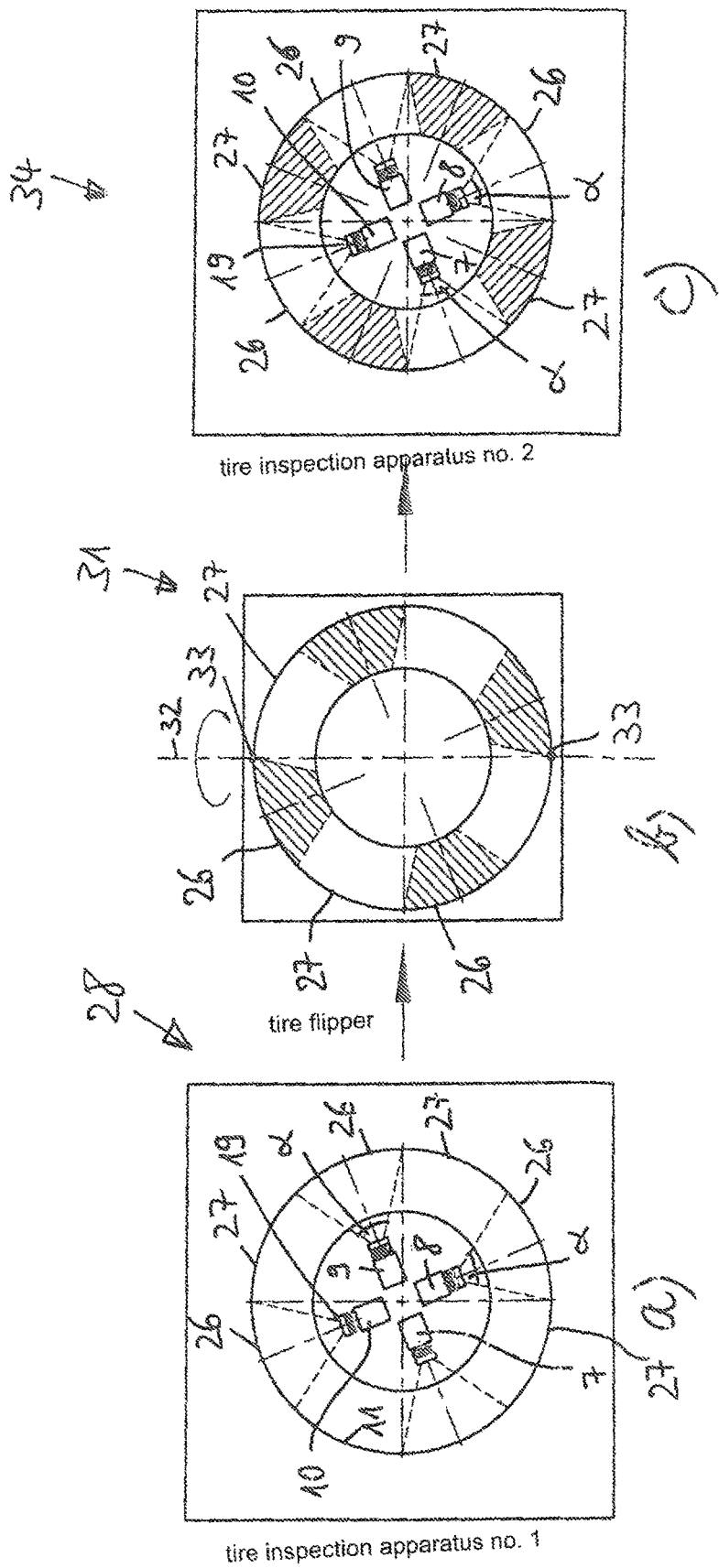
FIGS. 13a-c represent a sequence plan of the operation of a modified tire inspection system with a second tire inspection apparatus with four measuring heads for inspecting the inside surface of the tire tread.

FIG. 13 shows a sequence plan of the operation of a modified tire inspection system, which comprises a first tire inspection apparatus 28, a tire flipper 31, and a second tire inspection apparatus 34. Here, too, a tire inspection apparatus according to FIG. 4 is used, in which only a part of the inside tread surface of the tire is inspected. After it is flipped to the correct position in the tire flipper 31, however, the tire is sent to the second tire inspection apparatus 34.

FIG. 14 shows a sequence plan of the operation of the tire inspection system according to FIG. 10. A tire inspection apparatus 41 is used, in which three measuring heads 7, 8, 9 are present for inspecting the inside tread surface 11. The measuring heads 7, 8, 9 are spaced uniformly apart by 120°. They are located a certain distance away from the center axis 25 of the tire 4. The distance of the individual measuring head 7, 8, 9 from the inside tread surface 11 is shorter than the distance of the inside tread surface 11 from the center axis 25. The viewing angle α of the measuring heads is approximately 90°. Because of the shorter distance from the inner tread surface 11, the visual field 26 of the measuring heads is equal to approximately one-sixth of the circumference of the inside tread surface 11, which corresponds to an angle of approximately 60° on the inside tread surface 11.

Accordingly, gaps 27 remain between the visual fields 26 after the first inspection pass, as shown in FIG. 14a. After the tire has been flipped around the turning axis 32 to the correct position as shown in FIG. 14b, the visual fields 26 are situated at the points where previously the gaps 27 were present and vice versa, as can be seen in FIG. 14c. The correctly flipped tire 4 is then conveyed, as shown in FIG. 14d, into the tire inspection apparatus 41 and reinspected in a second inspection pass. In this way, the entire inside tread surface 11 can be covered.

FIG. 15 shows another sequence plan of the operation of the tire inspection system according to FIG. 10. Here a tire inspection apparatus 43 with two measuring heads 7, 8 is used. The measuring heads 7, 8 are set up a certain distance away from the center axis 25 of the tire 4. The distance of the individual measuring head 7, 8 from the inside tread surface 11 is greater than the distance of the inside tread surface 11 from the center axis 25. The viewing angle α of the measuring heads is approximately 80°. As a result of the increased distance from the inside tread surface 11, the visual fields 26 of the measuring heads 7, 8 each cover approximately one-fourth of the circumference of the inside tread surface 11, that is, an image area of approximately 90° on the inside tread surface 11. The measuring heads 7, 8 are set at an angle of 90° to each other.

In the case of the first inspection pass according to FIG. 15a, the visual fields 26 are directly adjacent to each other. They cover half of the inside tread surface 11, that is, 180° of the inside tread surface 11. The remaining area of the inside tread surface 11 forms a gap 27, which extends over the other half of the inside tread surface 11. After the tire has been flipped correctly, as indicated in FIG. 15b, the visual fields 26 are now present at the points where previously the gap 27 was located and vice versa, as can be seen in FIG. 15c. The correctly flipped tire 4 is now, according to FIG. 15d, conveyed into the tire inspection apparatus 43 and reinspected in a second inspection pass. In this way, the entire inside tread surface 11 can be covered.

FIG. 16 shows a device for determining the contour of the tire 4. This device comprises a device for determining the outside contour 41 of the tire 4 comprising two rows 35, 36 of light sources 37, 38, one row being provided on each of the two sides of the support surface 3. The rows 35, 36 are parallel to the direction in which the tire 4 is conveyed. The light sources 37, 38 are oriented at an angle to the support surface 3. The light cones of adjacent light sources 37, 38 overlap each other.

The device for determining the contour of the tire also comprises a device for determining the inside contour 43 of the tire 4. This device comprises light sources 42, which are mounted on the measuring heads 7, 8, 9, 10. The light sources 42 emit their light downward from the measuring heads. They have an aperture angle which is large enough to illuminate the entire inside contour 43 of the tire.

The support surface 3 is illuminated by the light sources 37, 38, 42. The area between the outside contour 41 and the inside contour 43 is covered by the tire 4. As a result, the annular surface 44 between the outside contour 41 and the inside contour 43, which corresponds to the contact surface of the tire 4, remains dark, as shown in FIG. 17. Only the pixels of the resulting image lying within the contour of the tire 4, that is, in the annular surface 44 between the outside contour 41 and the inside contour 43, are evaluated.

The outside contour 41 and/or the inside contour 43 of the tire 4 can be stored in a memory unit. The measuring heads can be positioned as a function of these values.

It is also possible to use previously stored values for the outside contour and/or the inside contour and/or the diameter and/or the height of the tire for the purpose of prepositioning the measuring heads. This prepositioning can be done as soon as the type of tire, still located outside the tire inspection apparatus, has been detected or has been read in.

The measuring heads can then be brought into their final positions after the tire has assumed the measurement position. As a result, a significant amount of time can be saved, because, after the tire has been positioned, the measuring heads need to be moved only over the remaining distance.

The outside contour and/or the inside contour of the tire, which has been detected by evaluation of the shadow cast by the tire, can be used to determine the optimal part of the tire to be imaged. These contours can therefore be used to position the measuring heads in the vertical and/or radial direction and/or to adjust the viewing angle of the measuring heads. On the basis of the determined outside contour and/or inside contour of the tire, furthermore, it is possible to mask out image areas which do not belong to the tire. It is possible to include only relevant image areas in the evaluation and/or to deliver only those areas as output to, for example, a display screen. It is also possible to evaluate the resulting images obtained only within the detected outside contour and/or inside contour. Within the scope of this evaluation, defects can be identified, classified, and/or counted. It is also possible to categorize the tire for further use on the basis of the evaluation, for example, as a useable or as an unusable tire. The result of the automatic defect detection process, furthermore, can also be subjected to further processing by hand.

According to the invention, it is possible, by appropriate arrangement of several measuring heads, to eliminate the need for relative rotation between the tire and the measuring heads. Thus a tire can be at least partially inspected very quickly by a short inspection pass without relative rotation. During this inspection pass, the upper side wall of the horizontally resting tire and at least half of the inside tread surface of the tire can be inspected. This rapid inspection can itself be sufficient to provide the desired information on the quality of the studied lot of tires and of the manufacturing process.

By expanding the measuring field of the measuring heads for the inside tread surface, a single measuring head can cover and inspect as much as 90% or more of the inside tread surface or the entire inside tread surface (FIG. 6).

It is advantageous for various processes involved in transporting the tires in the tire inspection system to be synchronized. This synchronicity can be achieved by ensuring that the tire flipper and all the tire inspection apparatuses are able to deliver a tire to the following station and to accept a new tire from the preceding station simultaneously. If a transport station is not able to do this, a buffer belt can be activated, which serves to accept a tire in synchrony with the preceding station, while another tire is being transferred to the following station, only after which is the tire taken transferred from the buffer station to the transport station. The buffer belts, however, can also serve to allow the time which may be necessary to allow perturbations of the tire caused by the flipping to settle down without negative effect on the overall inspection time of the sequential inspection apparatus.

It is advantageous for the measuring heads to be positioned vertically and radially with respect to the tire. It is then possible, even without optical adjustments of the measuring heads, to record an optimal image segment. Instead of or in addition to that, however, it can also be possible for the viewing angles of the measuring heads to be variable. It is advantageous for the measuring heads for inspecting the inside tread surface and the measuring heads for inspecting the external side wall to be movable separately from each other. This makes it possible in particular to execute faster movements because of the smaller masses.

It is also advantageous, if the tire dimensions are already known, to preposition the measuring heads even before the tire is positioned inside the inspection apparatus, so that, as a result of the short remaining distances to be traveled, the time required to bring the measuring heads into their final measurement positions can be decreased. For this purpose, information on the dimensions of the tire can be read in from an external source, such as a database. The tire dimensions can also be measured on machines installed upline.

The invention claimed is:

1. Tire inspection apparatus for the optical inspection of a tire (4), comprising
    a housing with a support surface (3) for the tire (4) to be inspected;
    several measuring heads (7, 8, 9, 10), each of which has an optical measuring system, for inspecting the inside tread surface (11) of the tire (4);
    at least one positioning device (21, 22, 23, 24) for raising and lowering some or all of the measuring heads (7-10) into a rest position and into a measuring position; and
    a device for determining, and/or a memory unit for storing, the diameter and/or the height of the tire (4), wherein
    the measuring heads (7-10) are coupled to the at least one positioning device (21, 22, 23, 24) without freedom of rotation and the support surface (3) is mounted without freedom of rotation.

2. Tire inspection apparatus according to claim 1, wherein the tire inspection apparatus is designed for the interferometric inspection of a tire (4), and in that the housing is designed as a pressure chamber (1).

3. Tire inspection apparatus according to claim 1, wherein the measuring heads (7-10) for inspecting the inside tread surface (11) of the tire (4) can be moved vertically and/or the measuring heads (12-17) for inspecting the external lateral surface (18) of the tire (4) can be moved vertically.

4. Tire inspection apparatus according to claim 1, wherein one or more or all of the measuring heads (7-10) for inspecting the inside tread surface (11) of the tire (4) can be moved radially.

5. Tire inspection apparatus according to claim 1, wherein the viewing angle (α) of the optical measuring system (19) of one or more or all of the measuring heads (7-10; 12-17) can be adjusted.

6. Tire inspection apparatus according to claim 1, wherein the measuring heads (7-10) for inspecting the inside tread surface (11) of the tire (4) inspect a portion of the inside tread surface (11), or in that the measuring heads (7-10) for inspecting the inside tread surface (11) of the tire (4) inspect the entire inside tread surface (11).

7. Tire inspection apparatus according to claim 1, comprising a device for prepositioning and/or positioning one or more or all of the measuring heads (7-10; 12-17) as a function of the diameter and/or the height of the tire (4).

8. Tire inspection apparatus according to claim 1, comprising a device for determining and/or displaying and/or evaluating the contour of the tire (4).

9. Tire inspection apparatus according to claim 8, comprising a device for evaluating the resulting images within the contour.

10. Tire inspection system comprising a tire inspection apparatus (28) according to claim 1 and a tire flipper (31).

11. Tire inspection system according to claim 10, comprising a tire flipper (31) for flipping the tire (4) to the correct position.

12. Method for the optical inspection of a tire in a housing, in which the tire (4) is inspected by several measuring heads (7-10; 12-17) for the interferometric inspection of a tire (4) by a tire inspection apparatus according to claim 1, wherein
    the measuring heads (7-10; 12-17) and the tire (4) do not rotate relative to each other.

13. Method according to claim 12, wherein the tire is inspected interferometrically in a pressure chamber.

14. Method according to claim 12, wherein the measuring heads (7-10) for inspecting the inside tread surface (11) of the tire (4) and/or the measuring heads (12-17) for inspecting the external lateral surface (18) of the tire (4) can be moved vertically.

15. Method according to claim 12, wherein the measuring heads (7-10) for inspecting the inside tread surface (11) of the tire (4) and/or the measuring heads (12-17) for inspecting the external lateral surface (18) of the tire (4) can be moved radially.

16. Method according to claim 12, wherein the measuring heads (7-10) for inspecting the inside tread surface (11) of the tire (4) inspect a portion of the inside tread surface (11) or the entire inside tread surface (11).

17. Method according to claim 12, wherein only the pixels of the resulting images which lie within the contour of the tire are evaluated.

18. Tire inspection apparatus according to claim 1, additionally comprising
    a pressure chamber (1) constituting the housing in which the support surface (3) is arranged and having a door (2), and
    a series of rollers (6) arranged outside the door (2) to the pressure chamber (1) for supporting the tire (4) on a rim thereof.

19. Tire inspection apparatus according to claim 18, additionally comprising a frame (51) situated above and around the series of rollers (6) outside the door (2) for determining height and diameter of the tire (4) passing therethrough.

20. Tire inspection apparatus according to claim 19, additionally comprising light sources (52) and receivers (53) arranged along an inner edge of the frame (51), forming a rectilinear grid for detecting the height and diameter of the tire (4).

21. Tire inspection system, comprising
(i) a tire inspection apparatus (28) comprising
a housing with a support surface (3) for the tire (4) to be inspected;
several measuring heads (7, 8, 9, 10; 12, 13, 14, 15, 16, 17), each of which has an optical measuring system, for inspecting the inside tread surface (11) and/or the external lateral surface (18) of the tire (4); and
a positioning device (21, 22, 23, 24) for moving some or all of the measuring heads (7-10, 12-17) into a rest position and into a measuring position,
wherein the measuring heads (7-10); 12-17) and the support surface (3) are installed without freedom of rotation,
(ii) a tire flipper (31), and
(iii) a second tire inspection apparatus (33).

22. Method for the optical inspection of a tire in a housing, in which the tire (4) is inspected by several measuring heads (7-10; 12-17), wherein the measuring heads (7-10; 12-17) and the tire (4) do not rotate relative to each other, and one or more or all of the measuring heads (7-10; 12-17) are prepositioned and/or positioned as a function of the diameter and/or the height of the tire (4).

23. Method for the optical inspection of a tire in a housing, in which the tire (4) is inspected by several measuring heads (7-10; 12-17), wherein the measuring heads (7-10; 12-17) and the tire (4) do not rotate relative to each other, and the tire (4) is inspected in a first inspection pass, flipped, and inspected in a second inspection pass.

24. Method according to claim 23, wherein a second tire is inspected in a first inspection pass while the first tire is being flipped.

25. Method for the optical inspection of a tire in a housing, in which the tire (4) is inspected by several measuring heads (7-10; 12-15, wherein the measuring heads (7-10; 12-17) and the tire (4) do not rotate relative to each other;

in the first inspection pass, one-half of the inside tread surface (11) of the tire (4) is inspected;

the tire (4) is flipped to the correct position; and in a second inspection pass, the other half of the inside tread surface (11) of the tire (4) is inspected.

\* \* \* \* \*